(No Model.)
J. B. MILLER.
LUBRICATOR.
No. 551,086. Patented Dec. 10, 1895.
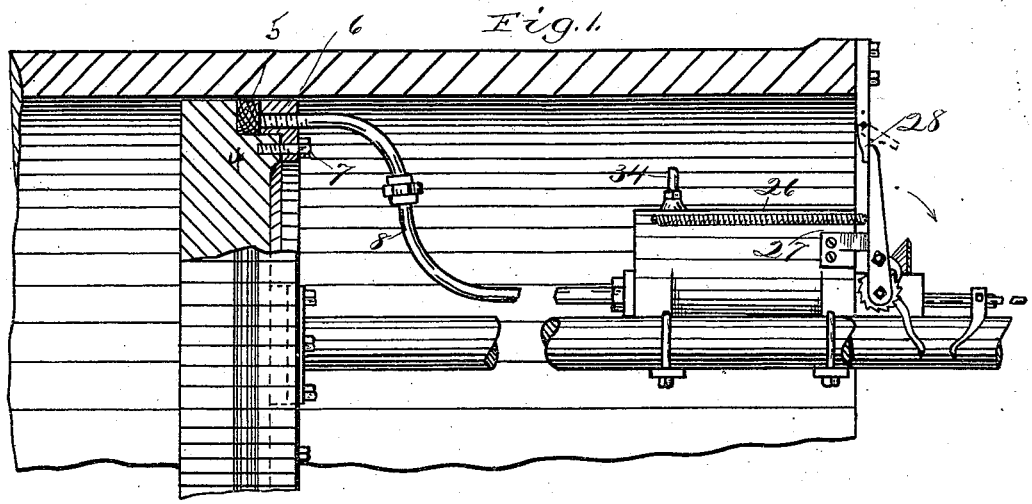
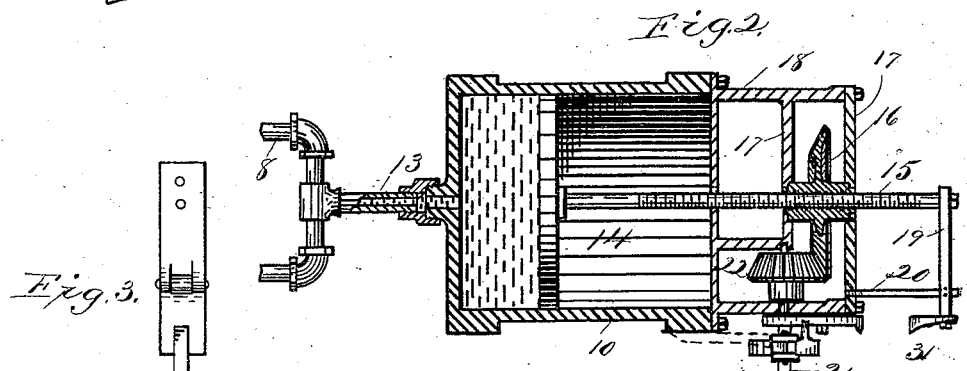
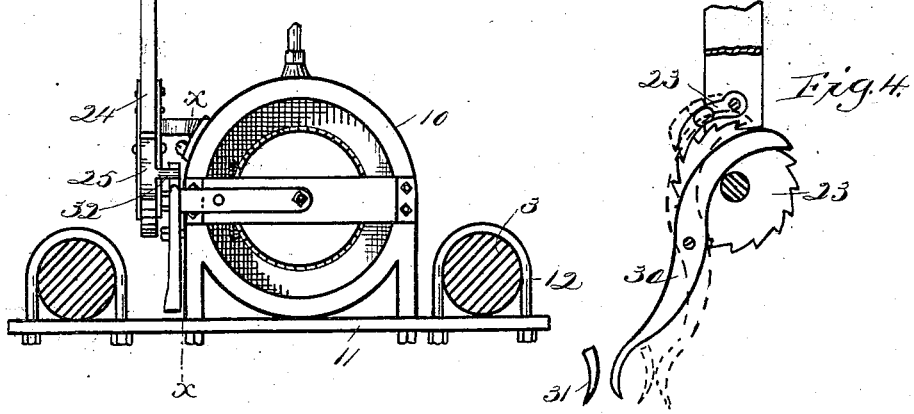
Witnesses.
Thomas Durant
Wallace Murdock
Inventor.
Joseph B. Miller,
by Church & Church
his Attorneys.

UNITED STATES PATENT OFFICE.

JOSEPH B. MILLER, OF ROCHESTER, NEW YORK, ASSIGNOR OF ONE-THIRD TO JOSEPHUS W. JANDELL, OF SAME PLACE.

LUBRICATOR.

SPECIFICATION forming part of Letters Patent No. 551,086, dated December 10, 1895.

Application filed January 17, 1895. Serial No. 535,264. (No model.)

*To all whom it may concern:*

Be it known that I, JOSEPH B. MILLER, of Rochester, in the county of Monroe and State of New York, have invented certain new and useful Improvements in Lubricators; and I do hereby declare the following to be a full, clear, and exact description of the same, reference being had to the accompanying drawings, forming a part of this specification, and to the reference-numerals marked thereon.

My present invention has for its object to provide an improved lubricator for pistons and particularly adapted for use in lubricating the pistons of hydraulic elevators, though capable of being used for other purposes; and it consists in certain improvements in construction and combinations of parts, all as will be hereinafter fully described, and the novel features pointed out in the claims at the end of this specification.

In the drawings, Figure 1 is a sectional view of a portion of a hydraulic cylinder and piston, showing my lubricator in side elevation; Fig. 2, a horizontal sectional view of the lubricator; Fig. 3, an end view of the same; Fig. 4, a sectional view on the line $xx$ of Fig. 3, looking to the left.

Similar reference-numerals indicate similar parts in the several figures.

In the present embodiment of my invention I have shown it applied to the piston of a hydraulic elevator in which the pressure is applied to the inner side of the piston-head only, 1 indicating the cylinder of any suitable construction and 2 the piston-head, to which is connected the double piston-rod 3. The oil or other lubricant is arranged to be applied in a chamber 4 at the periphery of the piston-head 2, preferably filled with packing or similar material 5, said chamber having an outer covering-ring 6, secured in position by bolts 7, and also having two or more apertures with which communicate the pipes 8, carrying the lubricant from the lubricator to said chamber 4.

The lubricator forming the subject-matter of my present invention embodies a cylinder 10, adapted to contain the lubricating material and supported upon the piston-rods 3 by means of a plate 11 and suitable clips or bolts 12, as shown in Fig. 3, the rear end of said cylinder communicating by a pipe 13 with the branch pipes 8 for carrying the lubricant to the periphery of the main piston, and arranged within the cylinder 10 is a piston-head 14, to which is connected a screw-threaded stem 15, adapted to be moved in and out by the rotation of a beveled wheel 16, having a threaded central aperture and supported between the bars of a frame 17, secured across the open end of the cylinder 10. Secured to the end of the spindle 15 is an arm 19, having an aperture through which passes a guide-stem 20, secured to the frame 17 and preventing the rotation of the spindle 15 when the gear-wheel 16 is rotated. Supported in the frame 17 is a spindle 21, having secured to it a beveled pinion 22, meshing with the gear 16, and upon its outer end is arranged a ratchet-wheel 23, which may have inclined teeth, as shown, or may consist of a plain gear, as will be understood, and loosely mounted upon said spindle 21 is a rock-arm 24, carrying a pawl 25, adapted to engage with the ratchet-wheel 23 and move the spindle 21 in the direction indicated by the arrow in Fig. 1. A spring 26 operates to keep the rock-arm 24 against a stop 27, and the upper end of said arm is adapted to engage a latch 28, secured upon the end of the main cylinder 1, so that as the piston moves inward the lower end of said latch will engage the upper end of the rock-arm 24, and will move the latter outward, turning the spindle 21, and through the gear moving the piston-head 14 toward the rear of the cylinder 10, forcing the lubricant out into the chamber in the main piston-head and lubricating the latter, and when the main piston moves outward again the latch 28 will yield, as shown in dotted lines in Fig. 1, permitting the passage of the arm 24.

In order that the device may be thrown out of operation when the piston-head 14 has reached the limit of its movement and all of the lubricant has been forced out of the cylinder 10, I provide upon the side of the frame 17 a lever 30, the lower end of which is adapted to be engaged by an arm 31, attached to the plate 19 on the threaded rod 15, the upper end of the said lever being so arranged that in normal position it will lie in a plane below the arc through which an arm 32 on the pawl moves; but when the lower end of said lever is engaged by the arm 31 its upper end will be raised to the position shown in dotted lines in Fig. 4, where it will engage said arm 32 on the pawl and hold the pawl out of engagement with the ratchet-wheel, and though the rock-arm 24 may be operated by the movements of the main piston relative to the cylinder the piston-head 14 will not be moved, as will be understood. The outer end of the spindle 21 is preferably made angular for the application of a crank, by means of which the piston-head 14 may be moved outward and the cylinder 10 filled with oil or other lubricant through a small pipe 34 in its upper side, as shown.

This device I find in practice operates admirably for the purpose for which it is adapted, the quantity of lubricant fed at each revolution of the piston being exact and the feeding being positive.

I claim as my invention—

1. The combination with the engine cylinder and the piston-head operating therein having a peripheral recess, of a lubricant cylinder connected to said piston-head, a piston operating therein having the threaded spindle, the internally threaded gear on the spindle held against longitudinal movement, the pinion and ratchet wheel, the rock arm having the pawl engaging said ratchet-wheel and the pivoted latch on the engine cylinder engaging the rock arm, substantially as described.

2. The combination with the engine cylinder and the piston operating therein, of a lubricant-cylinder and connections for supplying lubricant to the engine piston and cylinder, the piston operating in the lubricant cylinder, having the threaded spindle, the gear and the screw connection between it and the spindle, the ratchet-wheel and connections between it and the gear, the rock-arm, the pawl thereon engaging the ratchet-wheel, the spring operating the rock-arm in one direction, and a latch yielding in one direction and arranged between a suitable support and the rock-arm, said support and rock-arm being moved relatively by the movement of the engine piston in its cylinder, whereby when the engine piston is moved in one direction the rock-arm will be actuated, the lubricant piston will be operated and when moved in the other direction the latch will yield, substantially as described.

3. The combination with the engine cylinder and the piston operating therein, of the lubricant cylinder connected to the piston-head, the piston operating therein having the threaded spindle, the bevel gear having the internal thread and held from longitudinal movement, the ratchet-wheel, the rock arm, and the pawl thereon engaging the ratchet, the pivoted lever normally beneath the pawl, the arm connected to the piston for operating said lever, and a latch between the rock arm and a stationary abutment arranged to yield when the engine piston moves in one direction and to operate it when the piston moves in the other direction, substantially as described.

4. The combination with the engine cylinder, the latch thereon, the piston operating in the cylinder having the peripheral chamber, of the lubricant cylinder connected to and movable with the piston, and a pipe connecting it with the engine piston chamber, the piston operating in said cylinder, a rock arm supported on the engine piston adapted to engage the latch, and pawl and ratchet connections between said arm and the lubricant piston for actuating the latter progressively from the arm, when the latter is actuated by the movement of the engine piston in its cylinder, substantially as described.

JOSEPH B. MILLER.

Witnesses:
 F. F. CHURCH,
 G. A. RODA.